(12) United States Patent
Heaven et al.

(10) Patent No.: US 7,003,670 B2
(45) Date of Patent: Feb. 21, 2006

(54) BIOMETRIC RIGHTS MANAGEMENT SYSTEM

(75) Inventors: John Heaven, Markham (CA); Shane Steinman, Richmond Hill (CA); David Staples, Toronto (CA); Cliff Hunt, Mississauga (CA)

(73) Assignee: Musicrypt, Inc., Ontario (CA)

(*) Notice: Subject to any disclaimer, the term of this patent is extended or adjusted under 35 U.S.C. 154(b) by 756 days.

(21) Appl. No.: 09/875,987

(22) Filed: Jun. 8, 2001

(65) Prior Publication Data

US 2002/0188854 A1 Dec. 12, 2002

(51) Int. Cl.
*H04L 9/00* (2006.01)
*H04N 7/167* (2006.01)

(52) U.S. Cl. .................. 713/186; 713/172; 713/183; 380/37; 380/212

(58) Field of Classification Search ............ 380/201; 705/57; 713/186, 200, 201

See application file for complete search history.

(56) References Cited

U.S. PATENT DOCUMENTS

| | | | |
|---|---|---|---|
| 4,805,222 A | | 2/1989 | Young et al. |
| 5,765,153 A | * | 6/1998 | Benantar et al. ............... 707/9 |
| 5,887,140 A | | 3/1999 | Itsumi et al. |
| 6,092,198 A | * | 7/2000 | Lanzy et al. ................. 713/201 |
| 6,122,737 A | | 9/2000 | Bjorn et al. |
| 6,154,843 A | | 11/2000 | Hart, Jr. et al. |
| 6,219,421 B1 | | 4/2001 | Backal |
| 6,718,328 B1 | * | 4/2004 | Norris ........................... 707/9 |
| 2002/0146122 A1 | | 10/2002 | Vestergaard et al. |

FOREIGN PATENT DOCUMENTS

CA    2345170 A1    10/2001

\* cited by examiner

*Primary Examiner*—Kambiz Zand
(74) *Attorney, Agent, or Firm*—Dinesh Agarwal, P.C.

(57) ABSTRACT

An apparatus and method for using biometric information to control access to digital media that is obtained over a network such as the Internet. Encryption, techniques are used in combination with biometric verification technology to control and monitor access to online or locally held media. Biometrics such as keystroke dynamics are measured at a user's computer to confirm the identity of a user for the purpose of allowing the user to audit music files to which the user has authorized access.

26 Claims, 6 Drawing Sheets

BIOMETRIC RIGHTS MANAGEMENT SYSTEM

BACKGROUND OF THE INVENTION

This invention relates generally to an apparatus and method for managing digital rights, and more particularly to an apparatus and method for using biometric information to control access to digital media that is obtained over a network such as the Internet.

The convergence of computing, communication and music technology in recent years has created the opportunity for music sales on the Internet. Consumers can now download music files from a website over the Internet onto their personal computers. Artwork and liner notes can be viewed, downloaded and printed. To date, major music label catalogs have not been made fully available for digital music download largely due to the perceived risk of piracy of the music properties on the Internet. Today's technology has made it relatively easy for "savvy" users to copy and distribute (e-mail) music files or to burn the files to writeable CDs. The music industry is searching for technologies that will reduce the risk of piracy and ensure that rights-owners are properly compensated for the use of their property.

Various digital rights management (DRM) technologies have been proposed for authenticating user authorization to view and download media. At present, most DRMs take the form of some encryption of content and the provision of a key to authorized users of the content. A database of who acquired the rights to use the property is maintained. The key often takes the form of a password, which unfortunately can be easily shared with non-authorized users. Some DRM technologies attempt to overcome password sharing by using the user's computer serial number or IP (Internet) address as an additional key. The disadvantage of such technologies is that the content is locked down to a particular machine, or a limited number of systems (i.e., 2 or 3). This severely restricts the user's portability of the content. For example, music files downloaded on a home computer could not be heard on systems of friends and family members, at the office, or on portable computers or laptops other than the home computer.

Biometric technology has been proposed to control access to computing devices and networks by measuring a unique physical characteristic of an individual and comparing the measured characteristics with stored characteristics to determine if the individual has pre-authorized access approval. For example, U.S. Pat. Nos. 5,887,140, and 6,122,737, issued Mar. 23, 1999, and Sep. 19, 2000, respectively, disclose biometric systems in which fingerprint data is used to control distribution of information over a network. However, the use of fingerprint data requires users to purchase, install and use additional hardware. Additionally, the use of fingerprint data can raise privacy issues and negative sentiments in the minds of some consumers given the traditional association of fingerprint databases with the criminal elements of society. U.S. Pat. No. 4,805,222 issued Feb. 14, 1989, discloses a biometric verification technology in which the identity of an individual is determined based on keystroke dynamics. However, existing biometric proposals lack a comprehensive, user-friendly integration of biometrics with DRM.

Thus, there is a need for a biometric rights use management apparatus and method that provides increased security. There is a need for such a system that integrates biometrics with digital rights management to provide a comprehensive, secure and user-friendly system for accessing and downloading online media, and which provides for portability of such assets.

SUMMARY OF THE INVENTION

The present invention uses encryption in combination with biometric verification technology to control and monitor access to online media. In one embodiment, keystroke dynamics are measured at a user's computer to confirm the identity of a user for the purpose of allowing the user to download music files to which the user has authorized access.

According to one aspect of the invention, there is provided a method for allowing an authorized user to audit encrypted media files. The method includes measuring dynamic characteristics of an information entry by an authorized user to create a biometric profile of the authorized user; prompting an individual to perform the information entry, measuring dynamic characteristics thereof for comparison against the biometric profile of the authorized user, and verifying based on the comparison if the individual is the authorized user; and if the individual is verified as the authorized user, streaming a selected encrypted media file from a local or remote storage location, decrypting the streamed media file, and providing the decrypted streamed media file to an auditing device. Preferably, the dynamic characteristics include keystroke dynamics of an information entry made through a keyboard.

According to another aspect of the invention, there is provided a biometric rights management system for controlling access to encrypted media files. The digital rights use management system includes a remote server system having a database of encrypted media files and a database of user profiles, each associated with an authorized user, at least some of the user profiles including an associated biometric profile containing biometric information identifying the authorized user associated therewith. A plurality of user computer systems are connected to the remote server through the Internet, each of the computer systems having a biometric input device and being configured to (a) download from the server and store at a local storage device a selected encrypted media file; (b) download from the server and store at a local storage device a selected user profile and associated biometric profile; (c) measure biometric information of an individual using the biometric input device; (d) compare the measured biometric information with the downloaded biometric profile to verify if the individual is the authorized user associated with the downloaded user profile; and (e) the individual is verified to be the authorized user, permit the encrypted media file to be audited.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF PREFERRED EMBODIMENTS

In a preferred embodiment of the invention, individuals are assigned rights with respect to the playing, auditing, viewing, duplicating, converting, transforming or transferring of media files, whereby the identity of the authorized individual is verified through the cadence of their keystrokes when typing their password (or passphrase) into an authorization dialog box on a personal computer, and whereby these media files and associated rights are managed in accordance with the wishes of the copyright holder in the media files.

Figure 1:
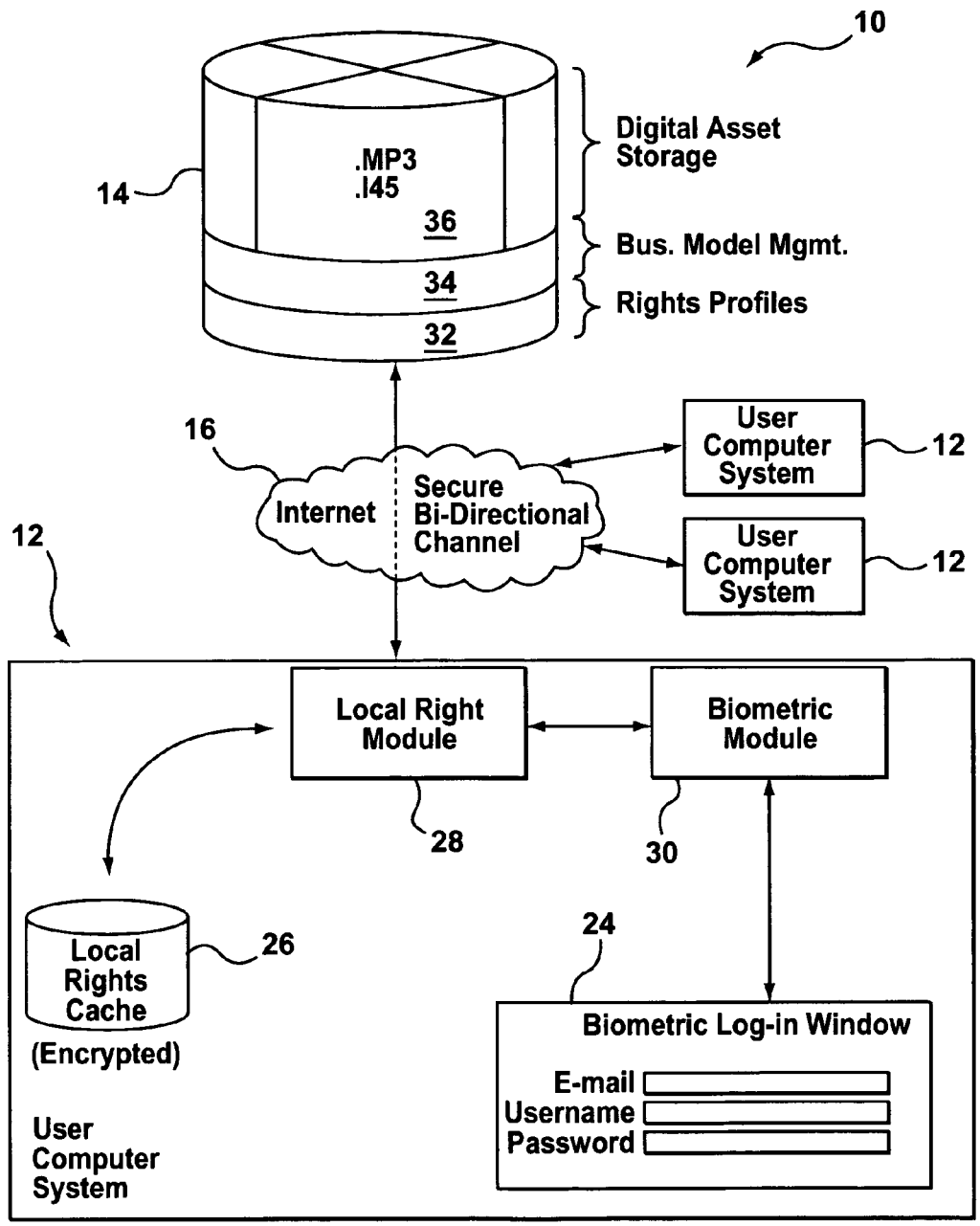
FIG. 1 is a block diagram of a biometric rights management system in accordance with a preferred embodiment of the invention.

FIG. 1 illustrates an overview of a biometric rights management (BRM) system 10 in accordance with a preferred embodiment of the invention. A plurality of user computer systems 12 and a remote biometric rights management computer server (BRM server) 14 are mutually connected via a communications network 16 such as the Internet. FIG. 1 shows an overview of various functional client side features implemented on the user computer system 12, including a local rights cache 26, local rights module 28, biometric module 30 and biometric log-in window 24. FIG. 1 also shows an overview of the features of BRM server 14, including a rights profile module 32, a business model management module 34, and a digital asset storage 36. These user computer and BRM serverfeatures will be described in greater detail below.

Figure 2:
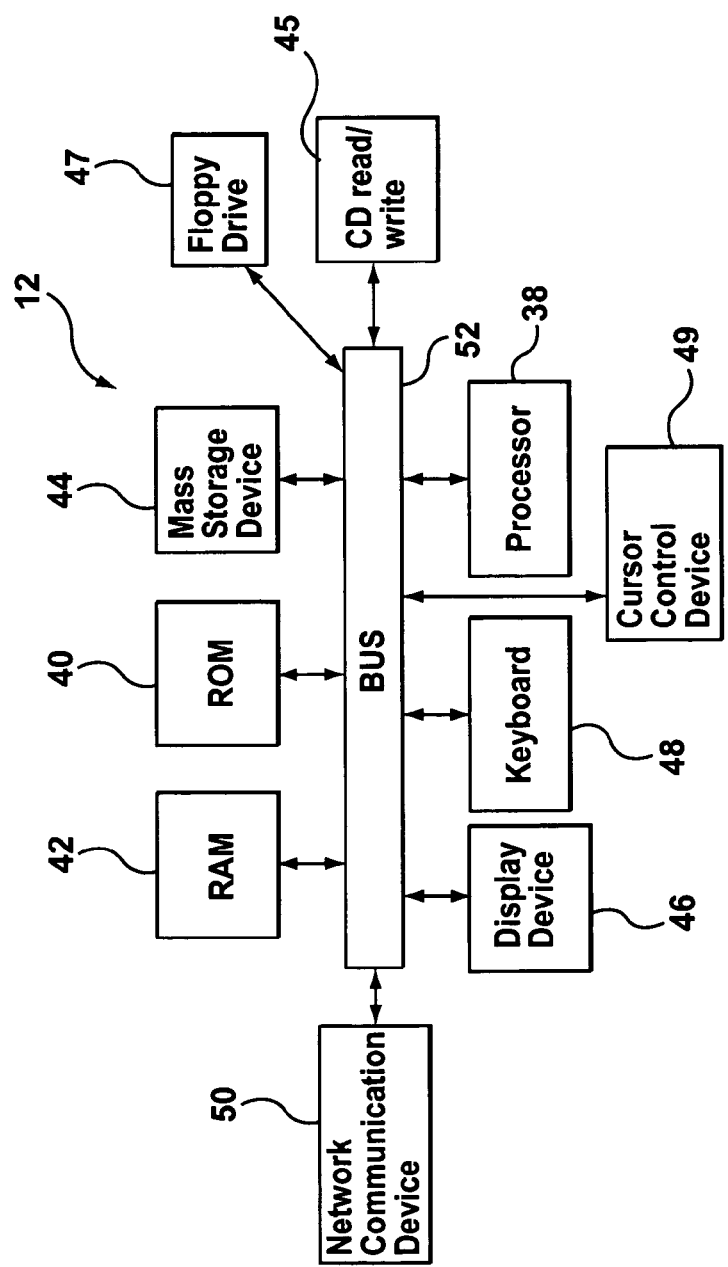
FIG. 2 is a block diagram representation of a user computer system of the biometric rights management system.

The user computer system 12 can be a suitably programmed conventional personal computer, as shown in FIG. 2, having a processor 38, read only memory 40 and writable memory 42 interconnected by a system bus 52. A mass storage device 44, such as a hard disk drive and drive controller, is also connected to the bus 52. Further, mass storage devices such as an optical disk read/write device 45 and floppy disk drive 47 may also be connected to the bus 52. An alphanumeric input device such as a keyboard 48, and a display device 46 such as a video terminal with corresponding video controller, are also connected to the system bus 52. A network communication device 50, such as an Ethernet card or other modem is provided for connecting the user computer 12 to the Internet 16. A cursor control device 49, such as a mouse, track ball or touch pad, may also be connected to the system bus 52. The configuration shown in FIG. 2 is merely an exemplary system. It will be understood that the user computer system 12 could have more or fewer components than, or alternative components to, those shown in FIG. 2, and still perform the functionality described herein. The BRM server 14 may also be a suitably programmed digital computer having a configuration similar to that shown in FIG. 2. The BRM server 14 may include more than one computer system, in which case the computers may be at different locations.

A brief overview of different functional aspects of the BRM system 10 will now be provided. Turning first to the user computer system 12, the local rights cache 26 provides a secure, encrypted local database at the user computer system 12. The local database, which is preferably stored on mass storage device 44, contains encrypted media files that have previously been downloaded from the BRM server 14 to the user computer system 12, and an encrypted user profile that lists the media files assigned to a particular user, the rights associated with their use of the media, and the scope, terms and limitations of that use. The local database may include rights profiles for more than one user if the computer system 12 is used by more than one individual.

The local rights module 28 provides overall local control of the client side aspects of the BRM system 10 that are implemented on the user computer system 12. In this respect, the local rights module 28 controls access to the database of the local rights cache 26, and additionally serves as a client-server communications manager for facilitating communications between the user computer system 12 and the BRM server 14. The local rights module 28 is configured to activate the biometric module 30 when necessary to verify or authorize rights to particulaar media files.

The biometric module 30 permits access under the BRM system 10 to be controlled based on biometric verification of the identity of an individual using the user computer system 12. Verification of the individual's identity is accomplished by comparing the characteristics of the individual's typing style with a previously stored profile of the same activity collected during a registration process which involves reiterative entry of the same password or passphrase. An example of a keystroke dynamics biometric identity verification system can be seen in the above mentioned U.S. Pat. No. 4,805,222, which has been assigned to Net Nanny Inc. of Vancouver, B. C., Canada. Preferably, such a system is used by the biometric module 30 of the present invention. In the biometric module 30 of the present invention, the comparative procedure preferably extends beyond the comparison of the biometric data (unique typing cadence) to the previous sample but also compares the unique conjugation of the individual's e-mail address, user name and password (-phrase), greatly minimizing unauthorized password use by any other individual. To do this, the biometric module 30 launches the biometric log-in window 24 through which the individual is prompted to enter his/her e-mail address, user name and password via keyboard 48. Once the individual is verified, within a predetermined likelihood, as genuine by the biometric module 30, the local rights module 28 permits the individual to exercise the rights associated with their identity with respect to any selected media file(s) protected by this method, provided that such rights have been previously attributed to both the individual and to the media file(s) selected. Because the method identifies each individual user, it is not necessary to associate media rights with a particular computer, but the individual is free to use the protected media files through any computer on which the client system software can be installed.

A brief overview of the BRM server 14 will now be provided. The BRM server 14 is configured to oversee the assignment of rights to users with respect to their digital media purchases made on-line and allow on-line or offline auditing (i.e., playing and listening and, in some cases, viewing) of those materials. The BRM server 14 routes signals to the user computer system 12 when an appropriate Internet connection is established. The rights profiles module 32 of the BRM server 14 is a relational database system that includes a database of the user profiles of all the users that have registered to access material from the BRM server 14. The business model management module 34 controls access to digital assets stored at the BRM server 14, and billing and reporting functions, based on the profiles stored in rights profiles module 32. The digital asset storage module 36 includes a securely encrypted database of the media files, which may be MP3 and other format files, that are available to users through the BRM system 10.

An overview of the BRM system 10 having been provided, aspects of the system will now be described to facilitate a better understanding of the—present invention.

The BRM system 10 requires individual users to proceed through an initial registration routine during which the rights profile for the user is created, and the user's computer system 12 is configured to communicate with the BRM server 14. This involves the creation of a user profile for each individual user of the BRM system 10. As noted above, in a preferred embodiment, the user profile for an individual user lists the media files assigned to that user, the rights associated with their use of the media, and the scope, terms and limitations of that use. The user profile is stored in encrypted form on the user's personal computer 12 (via local rights cache module 26) as well as on the BRM server 14 (via rights profiles module 32) to which the user's personal computer 12 may be connected through the Internet 16. The encrypted user profile may only be decrypted by the software provided to the user by the operator of the BRM server 10.

Figure 3:
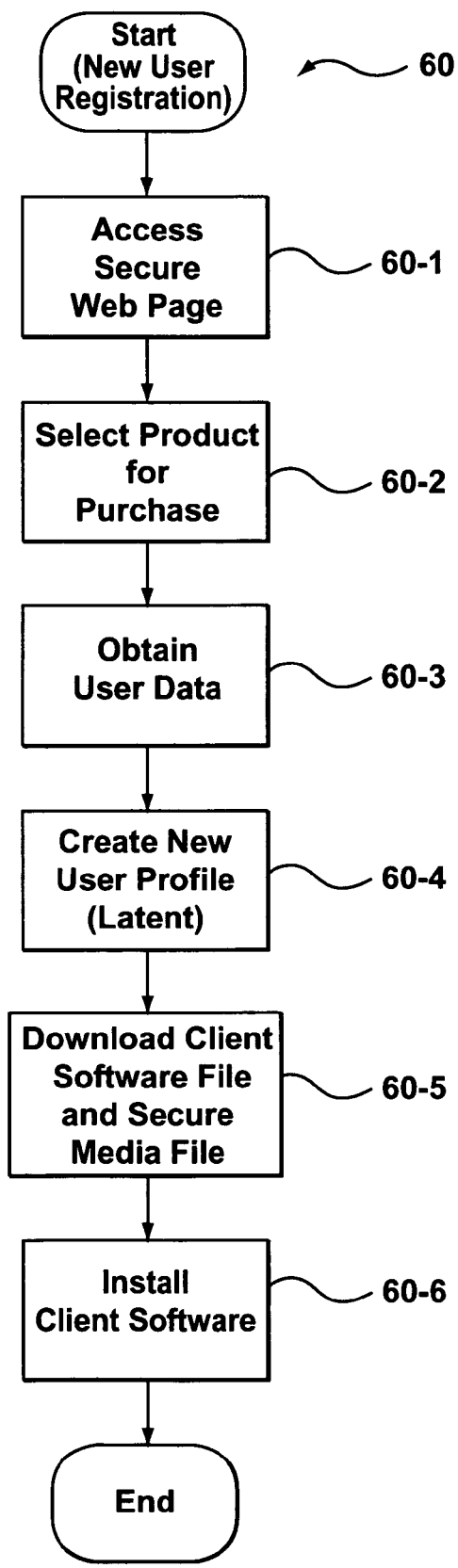
FIG. 3 is a flowchart indicating the initial steps involved in a new user registration procedure in accordance with an embodiment of the biometric rights management system.

FIG. 3 shows a flowchart 60 indicating the initial steps involved in a new user registration procedure. The creation of a user profile begins with the registration procedure which may be completed by the user employing an Internet browser software on his/her computer system 12 to access a secure HTML page (step 60-1) provided by the operator of the BRM server 10. The secure HTML page acts as an interface between the user computer system 12 and the BRM server 14 that is controlled by management module 34. In one embodiment of the invention, the user is prompted to select at least one media file product (for example an MP3 file) for purchase (step 60-2). The user is then prompted to provide identification, contact and payment information, preferably including his/her name, e-mail address, user name, password, credit card number and expiry date, and postal address (step 60-3). The user data is entered into a secure HTML page and transferred by secure protocol (HTTPS) to the BRM server 14 for inclusion in the relational database of rights profile module 32 which is geared to accept information on users, media files and the rights conditions that associate them (step 60-4). After entering the requested data, the user is presented with the opportunity to download client software that will allow them to exercise their usage rights with respect to various protected media files they may have purchased, or which were made freely available to them by the copyright holder. If the user accepts, the client software is downloaded via the Internet as a communications signal to the user computer system 12 (for example, in the form of an executable install file), along with any protected media files that the user may have purchased (step 60-5). The profile stored at the BRM server 14 is considered to be latent since it does not yet contain the biometric data that will be used to correctly identify the user later. Latent profiles may be associated with protected media files, but the files will remain inaccessible until the user supplies his/her biometric keystroke data as described below.

The client software file downloaded in step 60-5 includes software, including executable files, for configuring the user computer terminal 12 to implement the user-side local rights, local rights cache, biometric and biometric log-in window modules 26, 28, 30 and 24 shown in FIG. 1 and described above. Once downloaded, the client software is installed on a user's personal computer 12 by double-clicking on a file icon that is displayed on the user's display device 46 (step 60-6) (Alternatively, the client software can be configured to install dynamically immediately following the download). As part of the installation process, any protected media files that were downloaded are stored in the database of local rights cache module 26.

Figure 4:
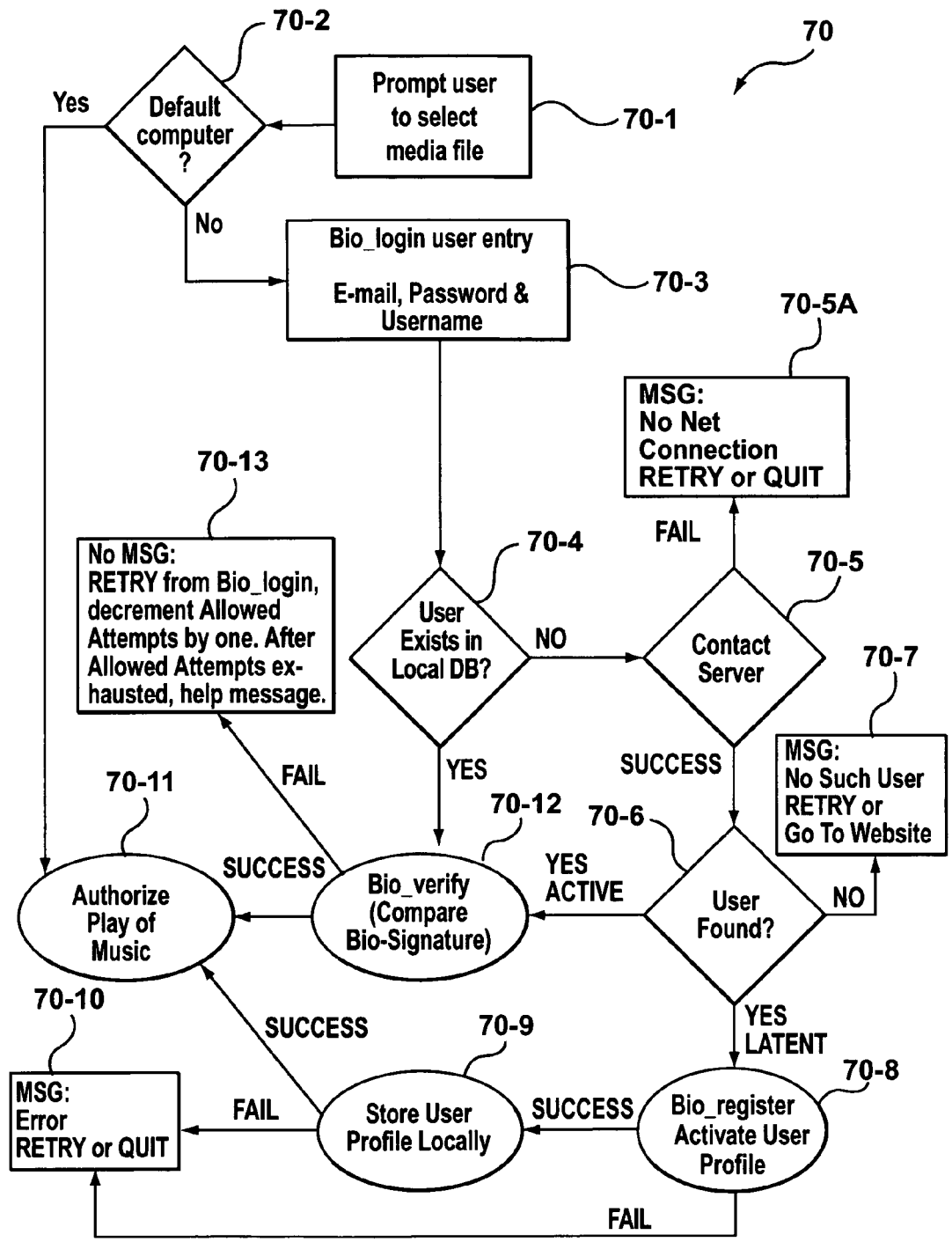
FIG. 4 is a flowchart indicating the steps involved in authorizing auditing of a media file in accordance with an embodiment of the biometric rights management system.

After installation, the user can activate the local rights module 28 by causing the user computer system 12 to run an executable local rights module file. FIG. 4 shows a flowchart representing the operation of installed client software on the user computer system 12. Once activated, in a preferred embodiment, the local rights module 28 prompts the user to select a protected media file for auditing (step 70-1) from among the protected media files that are stored in the database maintained by local rights cache 26. Alternatively, the client software may be launched by a user, without prompting, by clicking on any secure media file. Upon the user selecting the protected media file (which may, for example, be identified by the file extension ".i45"), in one preferred embodiment the local rights module 28 checks to see if a user profile exists in the local rights cache database which specifies the local computer as the "default auditing device" (step 70-2). If the assertion is true, the client software checks the selected profiles for rights to perform the function requested with respect to the protected media file. Finding such rights, the user is granted the requested functionality (step 70-11). The manner in which a user profile designating a default device is created is described below.

If the appropriate rights are not located in step 70-2, the local rights module 28 activates the biometric module 30, which activates the biometric log-in window 24 to present the user with an authorization dialog box for the collection of textual and biometric keystroke data (step70-3).

The user enters his/her e-mail address, user name and password (-phrase) and the biometric module 30 stores both the textual data and the biometric keystroke data (step 70-3) for comparison to all local profiles stored at the database of local rights cache module 26. The local rights module 28 performs a check to see if the user exists in the local database of local rights cache module 26 by comparing the text of the user-entered data (i.e., the e-mail and password) with stored data in the local database (step 70-4). If a local profile is found to match the textual data entered by the user (step 70-4), then the biometric module 30 compares the biometric data from the recent entry to that stored in the local encrypted user profile (step 70-12). If no biometric match is found, the user is prompted to re-enter the data (step 70-13), and if a predetermined number of attempts fail to produce a match, a help message is displayed advising the user that he/she will not be authorized to audit the selected media file. It will be appreciated that repeated failure to obtain a biometric match after a textual match has occurred is indicative of a misappropriated password. If at step 70-12 a biometric match is found by the biometric module 30, the user is granted the requested functionality (step 70-11).

If at step 70-4 the textual data does not match an existing user profile, it indicates that the user does not exist in the user computer system database and the client software, and in particular the local rights module 28, will seek a connection to the Internet (step 70-5) in order to determine if a matching user profile exists at the BRM server 14 (step 70-6). The lack of a matching user profile at the user computer system database indicates that, among other possibilities, the user has never registered with the BRM server 14, is a new registrant having a latent user profile, or that the user is an existing registrant with an active user profile but using a different computer system than he/she has used in the past. The client software is capable of detecting an existing connection to the Internet and making this transaction seamless to the user. If a connection does not exist, the client software will prompt the user to establish a suitable connection (step 70-5A). Once a valid connection is made to the Internet, the local rights module 28 sends encrypted packets to the BRM server If no matching textual user profile is located at the BRM server 14, it is likely that either the user has entered an incorrect e-mail address, user name or password, or has never registered, and accordingly the user is prompted to try entering the data again (by returning to step 70-1) or to create a new account at a specified URL (Universal Resource Locator) on the Internet if they have not already registered (step 70-7). If matching textual data is located at the BRM server 12, and the user profile is active (which is indicative of a registered active user attempting to access a media file from a non-default computer that they have not used before for that particular media file) then the user profile from the BRM server will be duplicated at the database of local rights cache module 26 of user computer 12 to complete the user verification process. After downloading the user profile, the local rights module 28 will activate the biometric module 30 to compare the biometric data from the recent entry to the recently downloaded biometric data stored in the local encrypted user profile (step 70-12). If no biometric match is found, the user is prompted to re-enter the data (step 70-13), and if a predetermined number of attempts fail to produce a match, a help message is displayed advising the user that he/she will not be authorized to audit the selected media file. If a biometric match is found by the biometric module 30, the user is granted the requested functionality (step 70-11).

If at step 70-6, matching textual data on the BRM server 14 is contained in a latent profile (for example, if the user is a new registrant), the BRM server 14 will instruct the local rights module 28 to activate the biometric module 30 to present the user with a biometric registration screen wherein the user's typing style on the keyboard 48 of user computer system 12 may be collected (in a server assigned number of iterations) and stored as a biometric profile in the user profile located on the BRM server 14, after which the profile would be changed from "latent" status to "active" status (step 70-8). The profile would then be duplicated as the user profile on the user's local computer (step 70-9), whereupon the user would be granted the requested functionality (step 70-11). In the event that activation of the user profile or local storage of it fails, an error message is displayed at the user computer system 12 (step 70-10).

The locally stored user profile is created in order to permit use of protected media files stored in the database of local rights cache module 26 to streamline the user verification and media authorization procedures when the locally stored user profile reflects the rights requested by the user. This permits media files locally stored at the user computer system 12 to be audited without requiring Internet access, provided that the locally stored user profile indicates that the user should have access to such files. Thus, with reference to step 70-4, if the local rights module 28 determines that the user exists in the local database, and that the user has the right to audit the subject media file, the biopassword module 30 will be called on to verify the user's identity through keystroke dynamics verification (step 70-12). If identity is confirmed, the desired authorization is granted (step 70-11).

As suggested above, in a preferred embodiment of the invention, a user can specify a specific computer as their default device. In such an embodiment, during bio-registration step 70-8, the user is asked whether he/she would like to make the current computer his/her "default auditing device". If the user indicates in the affirmative, a flag will be set in their user profile and a device ID that uniquely identifies the default device (for example a computer serial number) will be stored in their user profile (both at the server and locally) and he/she will not be required to supply biometric or textual user verification data when requesting to audit a protected media file that is associated with any user who specifies this computer as his/her "default" (ie. step 70-2 described above will allow the user to go directly to step 70-11, bypassing the intermediate biometric verification steps). If the user responds negatively, he/she will be asked to identify themselves by e-mail address, user name and password(-phrase) each time he/she begins an auditing session on the subject computer.

In one preferred embodiment, the user is asked if they to want set the current computer as their default computer whenever their user profile is downloaded to the current computer that they are using and a default computer is not already associated with that user profile. For security purposes (in order to impede a user from defining more that one device as their "default device") an internet connection must be in place in order to set any device as the "default". The user may remove "default" status from any device, providing that there is in an Internet connection in place, through a User Preferences menu that is displayed by the client software. Once the "flag" (and device ID) are removed from the user profile (locally and at the server) the user is free to assign this privilege to any other device.

Communication between the software provided on the user's personal computer 12 and the software resident on the remote BRM server 14 is accomplished in packets sent and received by TCP/IP and protected from unauthorized interpretation or interception by means of encryption for which only the server and client software (and in particular local rights module 28) have the necessary keys to perform decryption.

Figure 5:
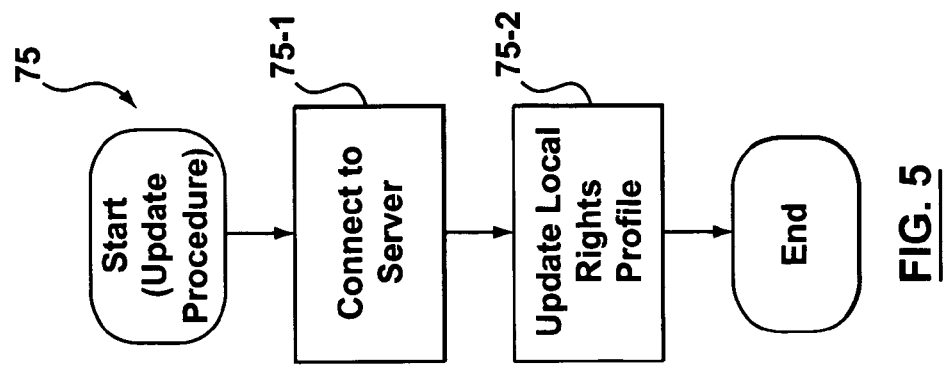
FIG. 5 is a flowchart indicating the steps involved in a locally stored user profile update.

In order that these communications may take place, the local rights module 28 may be configured, at various increments of time, to prompt the user to allow contact with the BRM server 12 by means of the Internet. With reference to FIG. 5, when the client software is operational, and a connection to the Internet exists, the local rights module 28 will auto-initiate contact with the BRM server 12 (step 75-1) to update the locally stored profile and reflect any new media associations with the user, as well as any corresponding rights that may have been created or altered during the time that the client and server softwares were not in communication (step 75-2).

To eliminate the need for unnecessary updates of the locally stored user profile, both the server stored user profile and the locally stored user profile are time-stamped after each successful update. When these time-stamps match, there is no need to update the locally stored profile.

To control access to media files available through the system of the present invention, these media files are also encrypted by the BRM server 12 prior to their distribution, and any downloaded media files stored in the database of the local rights cache 26 are stored in encrypted format. Such files may only be decrypted by the local rights module 28 provided that the steps shown in FIG. 4 and discussed above are carried out. In particular, this requires that the identity of the user is established by both biometric and textual comparison (to the previously stored samples) of the user's complete e-mail address, user name and password(-phrase) entry as prompted by the appearance of the authorization dialog box, and further, that the intended media profile use is assigned to the user with respect to any protected media file. In some instances, a user's e-mail address may be so convoluted that the user's keystroke dynamics are too inconsistent to use the biometric readings obtained during the e-mail entry for identification purposes. Preferably, the biometric module is configured to recognize such e-mail addresses during step 70-8 based on measurements made on successive e-mail entries, and flag the associated user profile accordingly, so that only user name and password (phrase) biometric data is needed to identify biometrically the associated user. In one preferred embodiment of the invention, a biometric comparison is only performed in respect of the user name and password(-phrase) entries, and not the e-mail address entry.

The encryption of a protected media file is such that it does not remain decrypted after it is used, but is persistently encrypted. The decryption process is facilitated by the local rights module 28 of the client software after authorization of the user and the intended use (authorization occurring as part of step 70-11 shown in FIG. 4) by means of direct streaming through the client software to an auditing software (for example, Real Audio Player™) selected by the user and which is made responsive to this practice by the local rights module 28.

Figure 6:
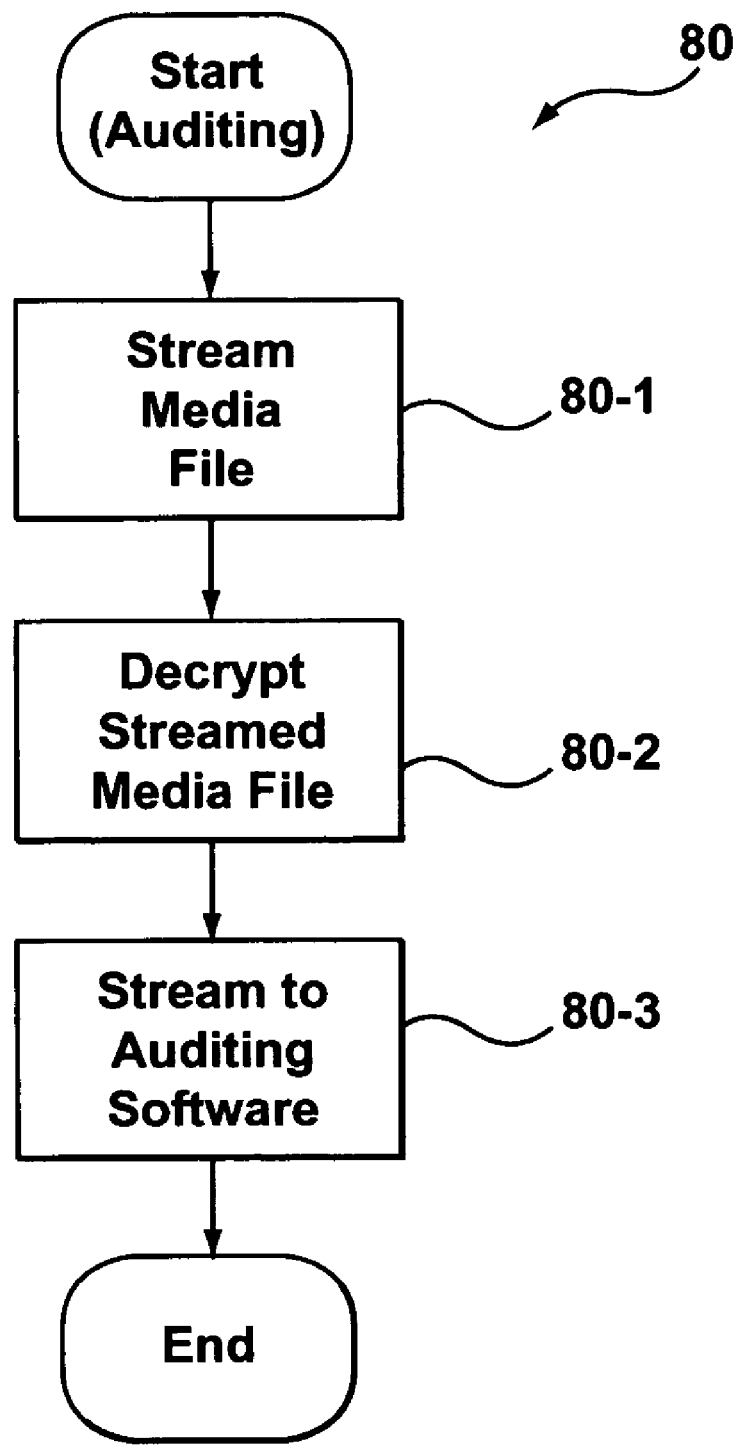
FIG. 6 is a flowchart indicating steps involved in auditing a locally stored media file once authorized to do so.

In this respect, FIG. 6 shows a flowchart 80 illustrating the steps involved in auditing a media file subsequent to authorization being granted in step 70-11. The local rights module 28 streams the encrypted media file from the database of local rights cache module 26 (step 80-1), decrypts the stream (step 80-2), and provides the decrypted stream directly to auditing software (step 80-3). In addition to a Real Audio Player™, other types of auditing software could be used, such as Windows Media Player™, for example. Steps 80-1 to 80-3, which comprise streaming of any media file from its encrypted state to the auditing software, are accomplished by means of a high speed decryption algorithm using a combination of keys to access the media file. Although a number of different encryption techniques known in the art could be used, in one preferred embodiment, the encryption method utilizes ten symmetrical keys (one 1-million bit key, five 2,048 bit keys and four 512 bit keys) in conjunction with dozens of algorithms to produce a highly secure encrypted file.

The combination of keys and algorithms produces a file with a statistically even distribution of characters, making it resistant to brute force attacks. Further, the encryption system is based upon a concept called Virtual Matrix Encryption available from Meganet Corporation, Encino, Calif., USA). The basis of VME is a Virtual Matrix, a matrix of binary values which is in theory, infinite in size and therefore contains no redundant values. The data to be encrypted is compared to the data in the Virtual Matrix. Once a match is found, a set of pointers that indicate how to navigate inside the Virtual Matrix is created. That set of pointers (which is worthless unless pointing to the right Virtual Matrix) is then further encrypted using dozens of other algorithms in different stages to create an avalanche effect. The result is an encrypted file that, even if decrypted, is completely meaningless since the decrypted data is not the actual data but rather a set of pointers. Considering that each session of VME uses a unique Virtual Matrix, and that the data pattern within the Virtual Matrix is completely random and non-redundant, there is no presently known way to derive the data out of the pointer set. VME is further described in U.S. Pat. No. 6,219,421 issued Apr. 17, 2001 to Backal, which is incorporated herein by reference.

Although the downloaded media files have been described above as being stored on a hard drive of the user computer system, the local rights cache 26 could also be configured to include files stored on other types of storage devices such as a floppy drive or a laser disk drive. Additionally, in other embodiments of the inventions, physical dynamics of a user activity other than keystroke dynamics could be used for creating a user profile. For example, the biometric profile could be based on the manner in which a user enters a specific shape using a cursor control device such as a mouse or track ball or touch pad.

Figure 7:
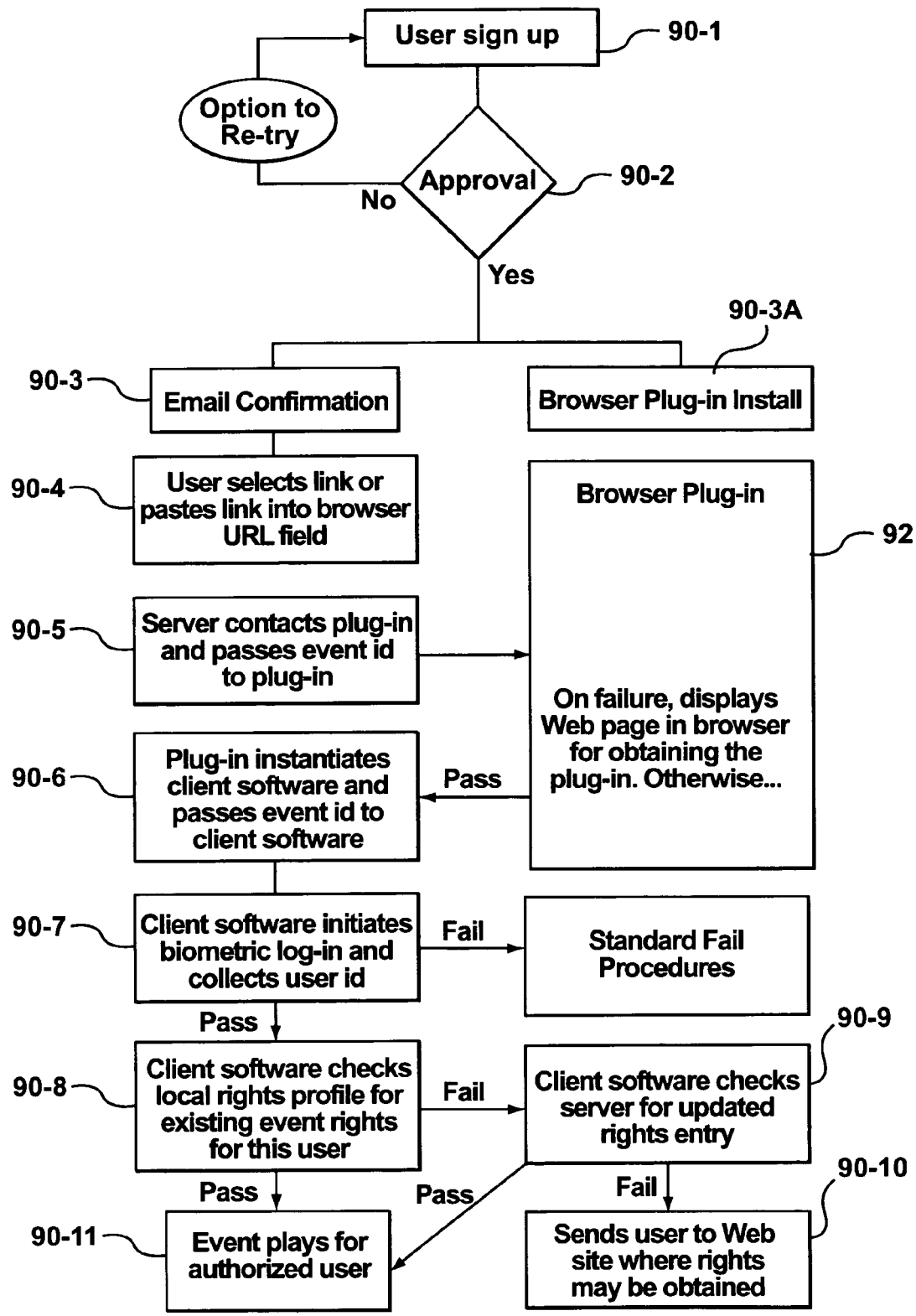
FIG. 7 is a flowchart indicating steps involved in real-time auditing of a media file streamed from a remote location.

In one embodiment, the biometric rights management system 10 is configured to allow on-line auditing of encrypted media files. In particular, media files are streamed from the BRM server 14 over the Internet 16 to the user computer system 12 and audited immediately without storage of the encrypted media file in persistent storage local to user computer system 12. A flow-chart illustrating a representative on-line auditing process is shown in FIG. 7. A user of user computer system 12 first signs up for the streamed event at a "sign up" Web page hosted by a server provided by the operator of the BRM server 14 for a streamed event (step 90-1). The streamed event may be a live event, such as a live concert, or may be based on a stored media file stored in digital asset storage 36 of BRM server 14. An automated approval process (step 90-2) based on information provided by the user (for example, payment information) is carried out. If approval is granted, the server hosting the "sign up" web page e-mails a receipt to the user, along with a link where the user may view the live or stored streaming event (step 90-3). Additionally, the user profile at rights profile database 32 at BRM server 14 is updated to indicate that the user has purchased right to the event, as is the user profile locally stored at user computer system 12.

In addition to the client software described above, the user computer 12 uses a browser plug-in 92 to interface with the client software as described below. In the event that the user's computer 12 does not have appropriate browser plug-in 92 installed the user is prompted to download and install the browser plug in (step 90-3A). (The flowchart of FIG. 7 assumes that the client software of the BRM system 10 has already been downloaded and installed on the user computer 12). At the appointed time (live event), or at the user's convenience (stored event), the user accesses the supplied web link (step 90-4), whereupon the BRM server 14 contacts the browser plug-in 92 on user computer 12, and passes the event ID to the plug-in 92 (step 90-5). The plug-in 92 activates the client software (and in particular the local rights module 28) by Active -X™ control or other means and passes the event ID to the local rights module 28 (step 90-6). The local rights module 28 activates the biometric module 30 and collects user id information, including keystroke dynamic biometric information, and authenticates the user based on such information (step 90-7). Provided the user passes the biometric log-in procedure, the local rights module 28 checks all local rights profiles stored at local rights cache 26 to see if the user has obtained auditing rights for the subject event (step 90-8). If the local rights profile does not indicate such rights (for example, if the user has switched computing devices since step 90-2 was executed), then the local rights module 28 contacts the BRM server 14 to see if the respective user profile stored in rights profiles database 32 indicates that the user has such rights (step 90-9). If the user does not have the appropriate on-line auditing rights associated with their user profile, they are sent to a Web site where rights may be obtained (step 90-10). rights (step 90-9). If the user does not have the appropriate on-line auditing rights associated with their user profile, they are sent to a Web site where rights may be obtained (step 90-10).

If the user does have the appropriate rights, then the local rights module authorizes the user and permits real-time auditing of the event at the user computer system 12 as the event is streamed from the BRM server 14 (step 90-11). In particular, the encrypted stream received over the Internet from the BRM server 14 is decrypted by the local rights module 28 and streamed to an auditing software (for example Real Audi Player™).

While a particular form of the invention has been illustrated in the figures and described, it will be appreciated that other modifications can be made without departing from the spirit and scope of the invention.

We claim:

1. A method for allowing an authorized user to audit encrypted media files, comprising:
    (a) measuring dynamic characteristics of an information entry by an authorized user to create a biometric profile of the authorized user;
    (b) receiving a request to audit a selected encrypted media file from an individual;
    (c) prompting the individual to perform the information entry, measuring dynamic characteristics thereof for comparison against the biometric profile of the authorized user, and verifying based on the comparison if the individual is the authorized user;
    (d) determining whether the authorized user has a right to audit the selected encrypted media file by consulting a user rights profile; and
    (e) if the individual is verified as the authorized user and the authorized user has the right to audit the selected encrypted media file, streaming the selected encrypted media file from a storage location, decrypting the streamed media file, and providing the decrypted streamed media file to an auditing device.

2. The method of claim 1, wherein step (a) includes measuring keystroke dynamics of the information entry made by the authorized user through a keyboard, the biometric profile being based on a typing cadence of the authorized user.

3. The method of claim 2 wherein the information entry includes a password for which dynamic entry characteristics are measured.

4. The method of claim 3 wherein the information entry includes user name address for which dynamic entry characteristics are measured.

5. The method of claim 1 wherein the media files are digitally encoded music files.

6. The method of claim 1 wherein, in step (c), the individual is prompted to perform the information entry at a user computer system, the storage location being a mass storage device locally accessible to the user computer system.

7. The method of claim 6 including, prior to step (e), a step of downloading the selected encrypted media file over the Internet to the mass storage device.

8. The method of claim 1 wherein the storage location is at a location remote from the auditing device and the media file is streamed over a network.

9. The method of claim 1 wherein, in step (c), the individual is prompted to perform the information entry at a user computer system, and prior to verification of the individual as being the authorized user, a check is performed to determine if a biometric profile for the authorized user is stored locally at the user computer system, and if not, a remote server is accessed over the Internet to determine if a biometric profile for the authorized user is stored at the remote server in which case the biometric profile is downloaded to the user computer system and used thereby for the comparison in step (c).

10. A computer readable storage device containing instructions for controlling a computer to perform steps according to claim 1.

11. A communications signal containing instructions for controlling a computer to perform steps according to claim 1.

12. The method of claim 1, wherein the user rights profile includes one or more associations between the authorized user and encrypted media files, and wherein said step of determining includes determining whether the one or more associations include an association between the authorized user and the selected encrypted media file.

13. The method of claim 12, wherein the association between the authorized user and the selected encrypted media file includes conditions of use, and wherein the step of determining includes determining whether the request to audit meets the conditions of use.

14. A computer program product comprising a computer-readable medium having computer-readable code embodied therein for allowing an authorized user to audit encrypted media files comprising:
    code means for measuring physical characteristics of an authorized user's typing style and creating a biometric profile of the authorized user based on the measured physical characteristics of the authorized user's typing style;
    code means for measuring physical characteristics of a typing style of an individual purporting to be the authorized user and comparing features thereof with the biometric profile to verify, within a predetermined likelihood, that the individual is the authorized user;
    code means for determining whether the authorized user has a right to audit a selected encrypted media file based upon a user rights profile; and
    code means for, if the individual is verified to be the authorized user and if the authorized user has the right to audit the selected encrypted media file, causing the selected encrypted media file to be streamed to an auditing device and decrypted.

15. The computer program product of claim 14 wherein the comparing of the features of the measured physical characteristics of the individual's typing style with the biometric profile is caused to be performed at a computer system at which the physical characteristics of the typing style of the individual are measured.

16. The computer program product of claim 15, including program code means for determining if the biometric profile for the authorized user is locally stored at the computer system and, if not, causing the computer system to contact a remote server over the Internet and download therefrom the biometric profile prior to comparing the features of the measured physical characteristics of the typing style of the individual with the biometric profile.

17. The computer program product of claim 16, wherein the encrypted media file is stored locally at the computer system and the auditing device includes a media player run by the computer system.

18. The computer program product of claim 14 wherein measuring of the physical characteristics of the individual's typing style is caused to be performed at a computer system and the encrypted media file is streamed from a remote server, the product including program code means for, if the individual is verified to be the authorized user, causing the encrypted media file to be streamed over the Internet from the remote server to a media player run by the computer system.

19. The computer program product of claim 14 wherein the computer readable medium is selected from the group consisting of a laser readable disc, a magnetic storage device and a communications signal.

20. The computer program product of claim 14, wherein the code means for determining includes codes means for identifying whether the user rights profile contains an association between the authorized user and the selected encrypted media file, wherein the association between the authorized user and the selected encrypted media file includes conditions of use, and wherein the code means for determining further includes code means for determining whether the request to audit meets the conditions of use.

21. A biometric rights management system for controlling access to encrypted media files, comprising:
 a remote server system having a database of encrypted media files and a database of user profiles each associated with an authorized user, at least some of the user profiles including an associated biometric profile containing biometric information identifying the authorized user associated therewith, the user profiles including one or more associations between the respective authorized user and one or more encrypted media files; and
 a plurality of user computer systems connected to the remote server through the Internet, each having a biometric input device and being configured to:
 (a) download from the server and store at a local storage device a selected encrypted media file;
 (b) download from the server and store at a local storage device a selected user profile and associated biometric profile;
 (c) measure biometric information of an individual using the biometric input device;
 (d) compare the measured biometric information with the downloaded biometric profile to verify if the individual is the authorized user associated with the downloaded user profile;
 (e) receive a request from the individual to audit the selected encrypted media file;
 (f) determine whether the selected user profile includes an association between the selected encrypted media file and the authorized user; and
 (e) if the individual is verified to be the authorized user and if the authorized user is associated with the selected encrypted media file, permit the encrypted media file to be audited.

22. The system of claim 21 wherein the biometric information of the authorized user and the individual includes information of keystroke dynamics of the authorized user and the individual, respectively, measured during entering of predetermined information using a keyboard or keypad.

23. The system of claim 22 wherein the predetermined information includes a password selected by the authorized user.

24. The system of claim 21 wherein at least some of the user profiles include information uniquely identifying a default computer system of the associated authorized user, at least some of said user computer systems being configured to determine if the user profile downloaded thereby identifies it as a default computer system, in which case the individual is verified to be the authorized user without requiring a comparison of measured biometric information with the biometric profile.

25. The system of claim 21 wherein the encrypted media files are digitally encoded music files.

26. The system claimed in claim 21, wherein the association between the authorized user and the selected encrypted media file includes conditions of use, and wherein the plurality of user computer systems are further configured to determined whether the request from the individual to audit the selected encrypted media file meets the conditions of use.

\* \* \* \* \*